US 6,679,116 B2
Jan. 20, 2004

(54) LIQUID LEVEL GAUGE WITH REMOVABLE HALL DEVICE

(75) Inventor: Herbert G. Ross, Jr., Argyle, TX (US)

(73) Assignee: Rochester Gauges, Inc., Dallas, TX (US)

( * ) Notice: Subject to any disclaimer, the term of this patent is extended or adjusted under 35 U.S.C. 154(b) by 0 days.

(21) Appl. No.: 10/337,810

(22) Filed: Jan. 7, 2003

(65) Prior Publication Data

US 2003/0084720 A1 May 8, 2003

Related U.S. Application Data

(62) Division of application No. 09/758,857, filed on Nov. 10, 2001.

(51) Int. Cl.[7] ............................................. G01F 23/32
(52) U.S. Cl. .......................... 73/317; 73/290 R; 73/314
(58) Field of Search ............................. 73/317, 290 R, 73/314, 866.1; 324/207.25, 207.13, 251, 156

(56) References Cited

U.S. PATENT DOCUMENTS

| | | | |
|---|---|---|---|
| 3,112,464 A | 11/1963 | Ratajski et al. ................ 338/32 |
| 3,742,243 A | 6/1973 | Gamble ....................... 307/106 |
| 3,777,273 A | 12/1973 | Baba et al. .................. 329/200 |
| 4,086,533 A | 4/1978 | Ricouard et al. ............ 324/208 |
| 4,125,821 A | 11/1978 | Masuda ..................... 338/32 R |
| 4,155,340 A | * 5/1979 | Fernquist et al. ............ 123/148 |
| 4,293,837 A | 10/1981 | Jaffe et al. ................. 338/32 H |
| 4,392,375 A | 7/1983 | Eguchi et al. ................. 73/118 |
| 4,395,695 A | 7/1983 | Nakamura ................. 338/32 H |
| 4,418,340 A | 11/1983 | Maeshiba .................... 340/618 |
| 4,425,557 A | 1/1984 | Nakamura ................. 338/32 H |
| 4,570,118 A | 2/1986 | Tomczak et al. ............ 324/208 |
| 4,703,261 A | 10/1987 | Berchtold ................... 324/207 |
| 4,719,419 A | 1/1988 | Dawley ...................... 324/208 |
| 4,987,400 A | 1/1991 | Fekete ........................ 338/164 |
| 5,055,781 A | 10/1991 | Sakakibara et al. ..... 324/207.21 |
| 5,159,268 A | 10/1992 | Wu ........................... 324/207.2 |
| 5,164,668 A | 11/1992 | Alfors ...................... 324/207.2 |
| 5,191,284 A | 3/1993 | Moretti et al. ............... 324/174 |
| 5,265,032 A | 11/1993 | Patel .......................... 364/509 |
| 5,270,645 A | 12/1993 | Wheeler et al. ......... 324/207.12 |
| 5,300,883 A | 4/1994 | Richeson ................ 324/207.22 |
| 5,305,639 A | * 4/1994 | Pontefract et al. ............. 73/317 |
| 5,351,387 A | 10/1994 | Iwata et al. ................. 29/602.1 |
| 5,444,369 A | 8/1995 | Luetzow .................. 324/207.2 |
| 5,570,118 A | 10/1996 | Rezanka et al. ............... 347/43 |
| 5,670,876 A | 9/1997 | Dilger et al. ........... 324/207.13 |
| 5,712,561 A | 1/1998 | McCurley et al. ........ 324/207.2 |
| 5,757,179 A | 5/1998 | McCurley et al. ........ 324/207.2 |
| 5,798,639 A | 8/1998 | McCurley et al. ........ 324/207.2 |
| 5,850,142 A | 12/1998 | Rountos et al. .......... 324/207.2 |
| 5,936,613 A | * 8/1999 | Jaeger et al. ................ 345/172 |
| 5,955,881 A | 9/1999 | White et al. ............. 324/207.2 |
| 5,982,170 A | 11/1999 | McCurley et al. ........ 324/207.2 |
| 6,018,241 A | 1/2000 | White et al. ............. 324/207.2 |
| 6,041,650 A | 3/2000 | Swindler et al. ............... 73/317 |
| 6,064,197 A | 5/2000 | Lochmann et al. ..... 324/207.14 |
| 6,089,086 A | 7/2000 | Swindler et al. ............... 73/317 |
| 6,530,293 B1 | * 3/2003 | Rückert et al. ........... 74/473.12 |

OTHER PUBLICATIONS

U.S. patent application Ser. No. 09/681,113, Lorenzen, filed Jan. 11, 2001.

* cited by examiner

*Primary Examiner*—Hezron Williams
*Assistant Examiner*—Rodney Frank
(74) *Attorney, Agent, or Firm*—Sidley Austin Brown Wood LLP

(57) ABSTRACT

A liquid level gauge assembly including a dial assembly having a shaped magnet and a removable magnetic detector with a magnetic sensor, preferably a Hall sensor. The dial assembly can provide both visual and electrical signal outputs of the liquid level measured by the gauge assembly. The shaped magnet has a variable thickness which, in cooperation with the Hall sensor, provides a linear output signal from the detector over more than 270 degrees.

16 Claims, 4 Drawing Sheets

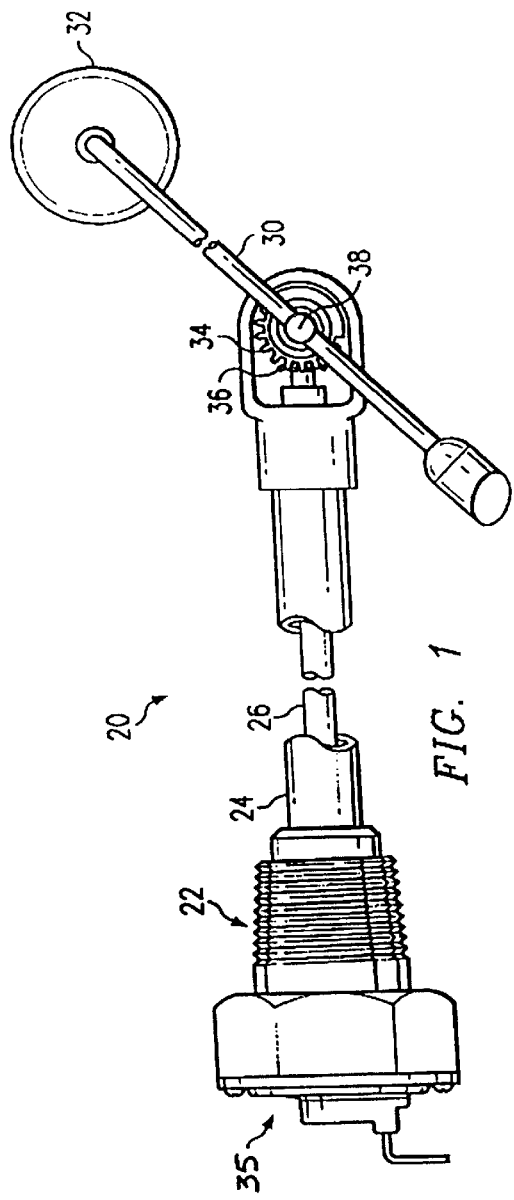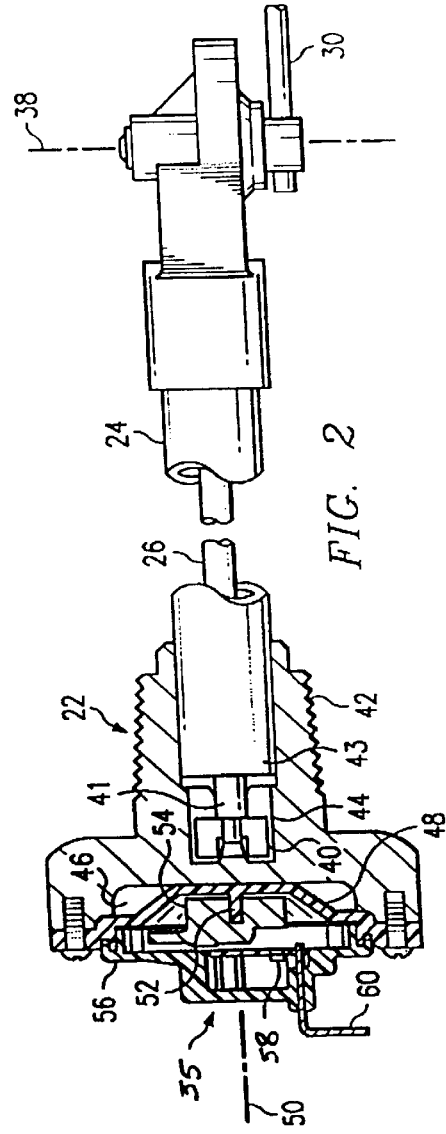

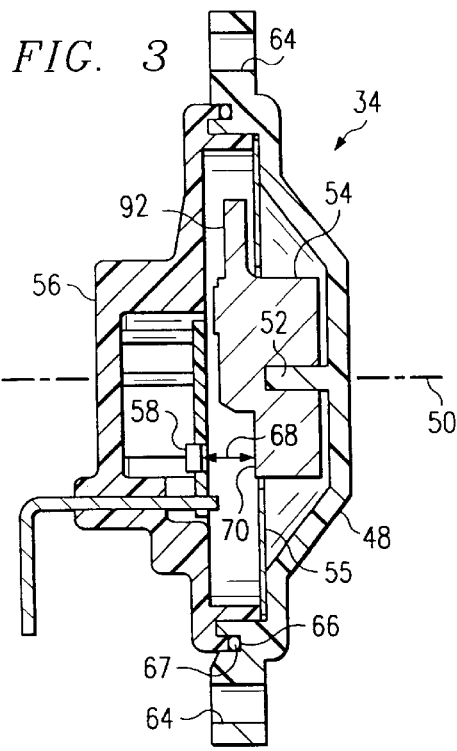
FIG. 3
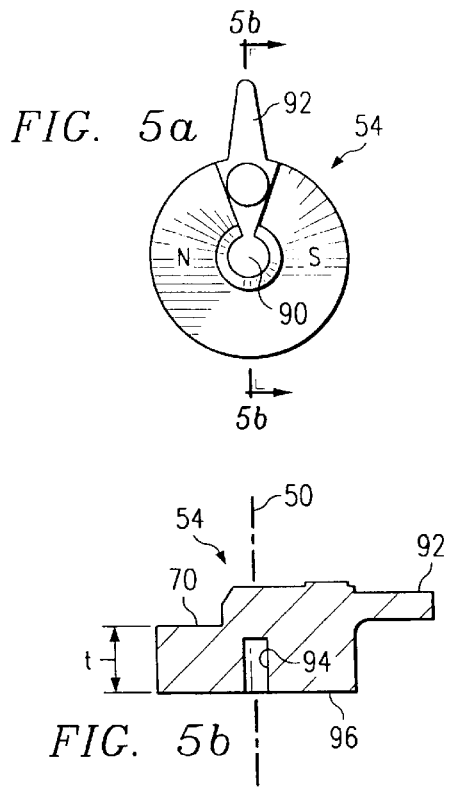
FIG. 5a
FIG. 5b
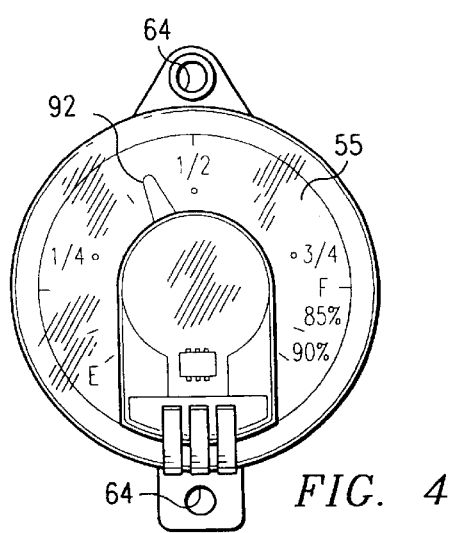
FIG. 4
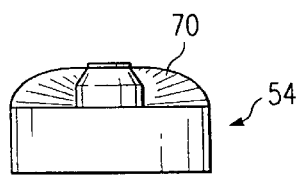
FIG. 5c
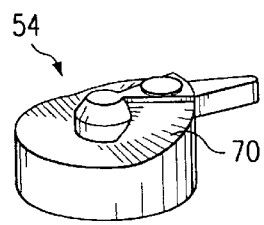
FIG. 5d

LIQUID LEVEL GAUGE WITH REMOVABLE HALL DEVICE

This application is a division of co-pending application Ser. No. 09/758,857, filed Jan. 11, 2001, the entire contents of which are incorporated herein by reference.

TECHNICAL FIELD OF THE INVENTION

This invention relates to gauge technology, and in particular to magnetically driven gauges having a magnetic sensor and detector to provide signal output.

BACKGROUND OF THE INVENTION

Liquid level gauges are frequently employed to monitor the level in a LP gas tank. There are instances where it is desirable to have both a visual indication of fluid level and an electrical indication of the fluid level. In the-area of LP gas measurement, a magnetic drive feature is important because the fluid is stored under pressure. A magnetic drive allows a signal from the float mechanism inside the tank to be transmitted through a solid, non-magnetic bulkhead without the necessity of dynamic seals or pressure-type conductors. Many magnetic liquid level gauges suitable for LP gas which include a magnetically-driven dial assembly are known such as that disclosed in U.S. Pat. No. 4,987,400 assigned to Rochester Gauges of Dallas, Tex. Also, there are many designs known for the construction of float arms and drive assemblies for use with liquid level gauges. These are exemplified in patents, such as U.S. Pat. No. 6,089,086.

In the past, liquid level gauges for LP gas provided a visual reading or a visual reading and an electronic output. Previous designs of liquid level gauges for magnetically driven gauges which produce an electrical output signal had the disadvantages inherent in using variable resistors with a wiper arm contact. The designs were subject to mechanical wear and a relatively complex construction involving a number of parts. Thus, there has been a need for a more reliable and simplified design for these LP liquid level gauges which provide an electrical output related to the liquid level in the vessel.

Hall effect sensors have been employed in various automotive applications such as described in U.S. Pat. Nos. 5,982,170 and 5,570,118 for controlling throttles. The magnetic connection of the Hall effect sensor is thought to be more reliable than systems which depend on the sliding contact of variable resistor devices.

LP gas is stored in pressurized containers which typically must meet certain governmental standards. The industry has current standards for the gauge head which mounts to the pressurized vessel. As a result, there are a great number of existing LP gas containers already equipped with existing gauges. The present invention has the advantage that the dial assembly of the present invention can be designed to be a retrofit on existing LP gauges with no need to change the mechanism of the float assembly within the tank. Many existing home and small business storage tanks are equipped with weak drive magnets suited for low friction direct-indicating dial assemblies. The present invention is low friction as there is no sliding wiper contact, and thus is compatible with existing gauges equipped with weak drive magnets within the tank, also known as tank magnets. Another advantage of the present invention related to the strength of the drive magnet is that the pointer magnet acts as a magnetic shield between the gauge drive magnet and the Hall effect sensor, protecting the Hall effect sensor from stray magnetic interference. Thus, this makes the present invention compatible with gauges equipped with strong drive magnets. Also, many of these existing storage tanks do not include a dial assembly which provides for electrical signal output. For example, many existing home and small business storage tanks do not include a dial assembly which provides for electrical signal output. The present invention is advantageous in that it can be used as a retrofit on these vessels to provide an electrical output which can be utilized for remote monitoring of tank levels. With remote monitoring of tank levels, distributors of LP gas will be able to more efficiently plan deliveries to various consumers. For example, the ability to transmit an electrical signal of the tank level for various customers to a distributor of the LP gas, allows the distributor to plan the most efficient use of delivery vehicles. Currently, many distributors are responding to calls from customers who request a delivery, but who are not able to provide accurate information as to the quantity needed. Distributors also currently are using pre-planned routes which are not based on actual need but projected need. As a result of weather fluctuations, these preplanned trips are often inefficient. The delivery truck either returns with a partial load or a second trip is required. The present invention facilitates remote monitoring of liquid level in storage tanks allowing for more efficient distribution of LP gas and other benefits.

The present invention also has the advantage of a design which minimizes the possibility of a mechanical failure due to wear since the magnet sensor, preferably a Hall device, is activated by changes in magnetic flux only, without the need of sliding contact of previous designs.

SUMMARY OF THE INVENTION

In one aspect, the present invention provides a magnetically driven dial assembly including a magnetic flux detector, preferably a Hall effect sensor. In one embodiment, the dial assembly includes a base which has a pivot axis, and preferably defines a cavity for receiving a shaped magnet. Extending from either the base or a cover, at the pivot axis, is a pin around which the shaped magnet rotates. Preferably, the shaped magnet has a generally circular shape in a plane substantially perpendicular to the axis of rotation, and has a variable thickness in a direction perpendicular to the plane (or parallel to the axis of rotation). Lying within the plane of the magnet is a magnetic axis upon which the north and south poles of the magnet are located on opposite sides of the center of the magnet. Preferably, the magnet includes a pointer, and the base is provided within indicia to indicate various liquid levels. A cap, or cover, is provided to encase the dial components, and a detector, including a Hall effect sensor, is removeablly positioned operatively adjacent to the shaped magnet. In a preferred embodiment, the cap defines a channel on its outside surface to receive a detector containing a Hall effect sensor.

In the preferred embodiment, a pointer is provided at the twelve o'clock position of the generally circular shaped magnet, and the north and south poles are located at the three o'clock and nine o'clock positions of the shaped magnet. The thickness of the magnet is greatest at approximately the eleven o'clock and one o'clock positions with the thickness decreasing from both positions to the thinnest part of the magnet at the six o'clock position. The distance between the Hall effect sensor and shaped magnet varies as the shape magnet rotates because of the variable thickness of the shaped magnet.

In another aspect, the present invention relates to a magnetically driven gauge which includes a gauge head, a movable float, and a float magnet which rotates in response to changes in the float position together with a dial assembly as described above.

BRIEF DESCRIPTION OF THE DRAWINGS

A more complete understanding of the invention can be had by referring to the following detailed description, together with accompanying drawings wherein:

FIG. 1 is a side view of a gauge assembly;

FIG. 2 is a side view of a gauge assembly with a partial cross section of the gauge and with a cross section of one embodiment of the dial assembly;

FIG. 3 is a cross sectional view of one embodiment of the dial assembly;

FIG. 4 is a front view of a dial assembly;

FIG. 5a is a top view of the shaped magnet used in a preferred embodiment;

FIG. 5b is a cross section along line 5b—5b of FIG. 5a;

FIG. 5c is a side view of FIG. 5a from the side of the shaped magnet opposite the pointer;

FIG. 5d is an isometric view of the shaped magnet used in a preferred embodiment;

DETAILED DESCRIPTION OF THE INVENTION

Figure 6A:
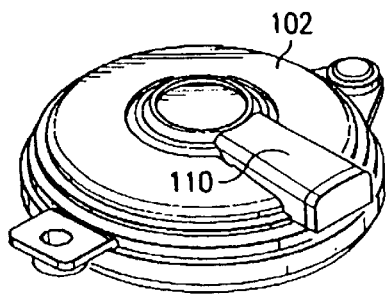
FIG. 6a is a perspective view of a cover of one embodiment of the present invention with a removable detector.

Referring now to the drawings wherein like reference characters designate like or corresponding parts throughout the several views, preferred embodiments of the liquid level gauge and the dial assembly of the present invention are illustrated. Referring first to FIG. 1, liquid level gauge 20 comprises gauge head 22 and support arm 24 attached to and projecting away from gauge head 22. The support arm 24 has an upper and lower end. The upper end is attached to the head 22. A magnet driveshaft 26 is installed in the support arm 24 so as to allow rotational movement of drive shaft 26. The drive shaft 26 has a first and second end. A tank magnet 40 (not shown in FIG. 1) is attached to the second end of driveshaft 26 adjacent to the gauge head 22. A float arm 30 is pivotally attached to support arm 24. A float 32 is attached to the float arm 30. Float 32 rests on the surface of the liquid (not shown) in the tank. As the liquid level changes the float 32 moves. Float arm 30 pivots around float arm pivot axis 38. Float arm 30 is connected to second gear 34 which rotates as the float arm 30 moves in response to changes in liquid levels. Second gear 34 cooperates with pinion gear 36 which is mounted on the first end of shaft 26. A dial assembly 35 is mounted on gauge head 22.

Referring now to FIG. 2, as float arm 30 moves, it pivots about float arm axis 38 causing second gear 34 to rotate, which in turn rotates pinion gear 36, attached to the first end of drive shaft 26, thereby rotating magnet drive shaft 26, and the tank magnet 40 attached to the first end 41 of the drive shaft 26. Gauge head 22 can be attached to a pressure vessel (not shown) by any conventional means such as threads 42.

Various construction tanks are known for the float arm 30 and gauge head 22 assembly which can be utilized to rotate magnet 40. Examples of alternative structures can be found in U.S. Pat. Nos. 6,089,086 and 6,041,650, hereby incorporated by reference. As can be seen in FIG. 2, gauge head 22 defines a passageway 44 which houses magnet 40 and a portion of drive shaft 26 and the upper portion 43 of the support arm 24. As can be appreciated when gauge head 22 is attached to a pressure vessel, the only sealing required is that between the threads 42 and the pressure vessel. The gauge head 22 is made of non-magnetic material, such as zinc, as is known in the art. On the top outside surface of the gauge head 22, the head 22 defines a receptacle 46 for receiving dial assembly 35. Dial assembly 35 has a base 48 which defines the dial axis 50. Extending from the base 48 along the axis 50 is pin 52. Preferably, the rotational axis of the dial assembly 35 when the dial assembly 35 is mounted on the head 22 of the gauge substantially aligns with the axis of rotation of the drive shaft 26. In the preferred embodiment, a shaped magnet 54 is pivotally mounted on pin 52. Base 48 is made from a non-magnetic material and preferably a plastic. As tank magnet 40 rotates in response to movements of the float arm 30, it rotates the magnetically coupled shaped magnet 54.

The dial assembly 35 includes a cover 56. In a preferred embodiment, mounted within cover 56, is a detector which includes a Hall effect sensor 58. Hall effect sensor 58 is positioned operatively adjacent to the outer periphery of shaped magnet 54. The detector is connected to electrical leads 60.

FIG. 3 shows a preferred embodiment of the dial assembly 35 in more detail. In the preferred embodiment, a disk 55 marked with indicia indicating liquid level is placed in the base 48 or is printed directly on a portion of the base 48 so that as magnet 54 rotates, it rotates pointer 92 about the indicia disk 55. The dial assembly 35 can be provided with passageways 64 which allow screws to be passed therethrough to attach the dial assembly 35 to the gauge head. Preferably, the cover 56 is ultrasonically welded to the base 48 to produce a hermetic seal. The base 48 may be provided with a groove 66 into which an O-ring 67 can be inserted prior to ultrasonic welding to help seal and protect the weld joint. The cover 56 can be made of plastic material and preferably is transparent so that the dial indicia 55 can be observed. Optionally, the pointer 92 and indicia 55 need not be used and the dial assembly 35 can be used to produce only electrical output and no visual output. A gap 68 is provided between the Hall effect sensor 58 and the top surface 70 of the shaped magnet 54. As the shaped magnet 54 rotates, the length of the gap 68 changes. FIG. 4 shows a front view of the dial assembly 35 showing indicia disk 55 and pointer 92.

The preferred embodiment of the shaped magnet 54 is shown in FIGS. 5a, 5b, and 5c. As shown, magnet 54 has a generally circular shape in a plane substantially perpendicular to the axis of rotation 50. In the preferred embodiment, the shaped magnet 54 has an integral extending pointer 92. In an alternate embodiment, the shaped magnet 54 may be attached to a separate pointer. The center 90 of magnet 54 in the preferred embodiment corresponds to axis 50 about which it rotates. In the preferred embodiment, the magnet 54 includes an extending pointer 92. As can be seen in FIG. 5b, which is a cross-sectional view of FIG. 5a along line 5b—5b, the magnet defines a passageway 94 for receiving pin 52 extending from the base so that magnet 54 may rotate or pivot about axis 50 and pin 52. In planes perpendicular to axis 50, the magnet 54 has a generally circular shape. In directions parallel to axis 50, the magnet 54 has a variable thickness "t" which is the distance from the portion of the top surface 70 along the periphery of the magnet 54 which is adjacent to the Hall effect sensor 58 to the bottom end 96 of the magnet 54. As can be seen in FIGS. 5b and 5c, the thickness along the periphery of the magnet 54 underneath the detector increases in the direction of the pointer 92. FIG. 5c is a side view of the magnet 54 looking from the side opposite of pointer 92 and illustrates the curving, uplifting top surface 70 of the magnet 54.

Returning to FIG. 5a, for purposes of discussion, pointer 92 shall be considered zero degrees or the twelve o'clock position of the shaped magnet 54. The south pole is located at the three o'clock position and the north pole is located at the nine o'clock position opposite the south pole and on the other side of the center 90. The pole positions may be reversed if desired. A magnetic null exists along the line between the pointer 92 at the twelve o'clock position and the six o'clock position of the magnet 54. As is illustrated in FIG. 5a, the preferred embodiment has a pointer 92 extending from the magnet 54. It is not necessary to utilize a pointer 92 if no visual read out is desired. Further, the pointer may be a separate piece to which the shaped magnet 54 is attached. However, in the preferred embodiment the pointer 92 and shaped magnet 54 are a single piece. The shaped magnet 54 is preferably generally circular in shape in planes perpendicular to the axis of rotation. Referring to FIG. 5a and 5b, as one starts at the bottom 96 of the magnet 54, the shape is circular, until the thinnest portion is reached at the six o'clock position. Above that, the cross section is generally circular but is no longer a complete circle, if the extending pointer 92 is not considered, as is illustrated in FIG. 5d. It is appreciated that at the upper portion of the magnet 54, the cross section at a given location may not be entirely circular and will vary because of the variable thickness of the shaped magnet 54. For example, a cross section perpendicular to the axis at the top surface at the 3 and 9 o'clock position.

Other types of shaped magnets could be used without deviating from the present invention. Ideally, the magnets should be situated in the base 48 such that the magnet has a variable thickness in a direction parallel to the axis of rotation. Not all gauges rotate over 180 degrees. Other magnet shapes may be employed for dials having less than 180 degree rotation.

Figure 6B:
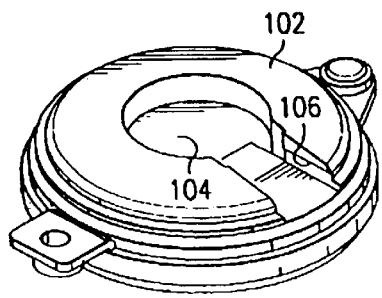
FIG. 6b is a perspective view of FIG. 6a with the detector removed.
Figure 6C:
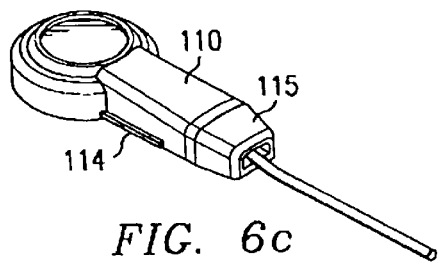
FIG. 6c is a perspective view of a removable detector for use in the present invention.

FIG. 6a shows an embodiment of the top cover 102 with a removable detector 110. FIG. 6b shows the cover 102 of FIG. 6a with the detector 110 removed. Cover 102 defines a channel 104 for receiving detector 110. Lips 106 can be provided along the sides of channel 104 to provide a mechanism for retaining a removable detector 110. FIG. 6c is a perspective view of a detector 110. The detector 110 includes a Hall effect sensor (not shown). The detector 110 is shaped to fit within channel 104 and can be provided with ridges 114 to cooperate with lips 106 of channel 104 to retain the detector 110 in position within channel 104. The detector 110 can be connected to appropriate instrumentation by electrical lead assembly 115. This embodiment is beneficial in that it allows the dial assembly 35 to be used without the detector 110 and still be useful to provide visible measurement readings. Also, it further provides the user the option of adding the detector 110 at a later date. Further, this design offers the benefit that defective detectors can be easily replaced with a new detector.

Figure 7:
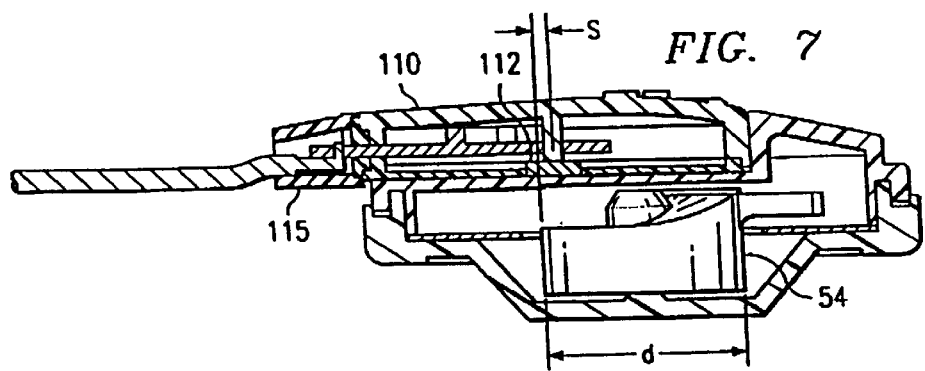
FIG. 7 is a cross sectional view of the base, cover, and detector, and a side view of a shaped magnet.

FIG. 7 illustrates the relative position of the Hall effect sensor 112 in relation to the outer periphery of magnet 54. In a preferred embodiment of the present invention, the components are dimensioned to permit construction of a dial assembly which can be substituted in place of pre-existing dial assemblies. This permits retrofitting without replacement of the gauge head or float assembly. The diameter "d" of the magnet 54 is approximately 0.58 inches or a radius of 0.29 inches. In a preferred embodiment, the thinnest part of the magnet 54 at the six o'clock position is approximately 0.2 inches, and the thickest parts at approximately the one o'clock and eleven o'clock positions are approximately 0.3 inches. The Hall effect sensor 112 is positioned over the shaped magnet 54 approximately 0.047 inches from the outer edge of the magnet 54. In the preferred embodiment of the present invention, the Hall effect sensor 112 should be placed a distance (as illustrated in FIG. 7) from the outside perimeter of the magnet 54 to the radius of the magnet 54 at a ratio of between about 1:5 and about 1:8 and preferably about 1:6. In the preferred embodiment, the minimum gap 68 between the thickest part of the magnet 54 and the sensor 112 is approximately 0.04 inches, and at the maximum gap 68 between the sensor 112 and magnet 54 is approximately 0.16 inches. These dimensions are all based on the preferred embodiment and can be varied for larger constructions.

The detector 110, including the Hall effect sensor 112, has circuits and amplifiers which provide a predetermined voltage at a magnetic null and subtract or add to the voltage depending upon the polarity of the magnetic field. In the preferred embodiment of the invention, the detector 110 produces a constant voltage of about 2.5 volts when the Hall effect sensor 112 is over the magnetic null at the six o'clock position and twelve o'clock positions of the magnet 54. Northern magnetic flux lines sensed by the Hall effect sensor 112 result in a decrease in the voltage produced by the detector 110 and southern magnetic flux lines sensed by the Hall effect sensor 112 result in an increase in the voltage produced by the detector 110.

An advantage of a preferred embodiment is that a substantially linear voltage output can achieved over more than 270 degrees rotation by utilizing a shaped magnet. In operation of the preferred embodiment, when the tank is empty, the float 32 will be at its lowest position, and the shaped magnet 54 of the dial assembly 35 will have the thickest point of the shaped magnet 54 which is located at about the eleven o'clock position on the north pole side of the magnet 54 directly under the Hall effect sensor 112. The magnetic flux density is an inverse square relation of the distance. At the approximately eleven o'clock position on the magnet 54, the north magnetic flux would be relatively weak if the magnet 54 were of constant thickness. However, the gap 68 between the top surface 70 of the magnet 54, and the Hall effect sensor 112 is smallest at the eleven o'clock position, and this results in a strong magnetic signal to the Hall effect sensor 112. As the magnet 54 rotates clockwise and brings the nine o'clock position, the north pole of the magnet 54 is under the Hall effect sensor 112, the gap between the top surface 70 of the magnet 54 and Hall effect sensor 112 increases. Since the strength of magnetic flux is inversely proportionate to the square of the distance, the signal detected by the Hall effect sensor 112 is less strong than the signal sensed at the eleven o'clock position. The surface of the magnet 54 is shaped such that the Hall effect sensor 112 detects a decreased north magnetic flux as the shaped magnet 54 rotates in a clock-wise direction. When the shaped magnet 54 rotates sufficiently enough that the six o'clock null is under the Hall effect sensor 112, no magnetic flux is sensed. As the magnet 54 continues to rotate clockwise, and the gap 68 between the top surface 70 of the magnet 54 and the Hall effect sensor 112 decreases. Thus, as the shaped magnet 54 rotates from the six o'clock null being under the Hall effect sensor 112 to the one o'clock position being under the Hall effect sensor 112, an increasingly strong southern magnetic flux will be sensed by the Hall effect sensor 112. The shaped magnet 54 has a variable thickness such that the gap 68 between the top surface 70 of the magnet 54 under the Hall effect sensor 112 will vary. The magnet 54 is shaped so that as it is rotated the predetermined distance from the magnet 54 to the Hall effect sensor 112 results in a substantially linear decrease in the magnetic flux density through about 135 or more degrees of rotation to a null and then a substantially linear increase in magnetic flux density as the magnet rotates to 270 or more degrees of rotation. Thus, the surface 70 is shaped to produce magnetic flux which varies substantially linearly when sensed at a predetermined location.

Without deviating from the present invention an alternatively shaped magnet could be used. Depending on the shape of the magnet used, the substantially linear voltage output may not be over 270 degrees rotation, as in the preferred embodiment.

Referring to FIG. 7, there is shown a side view of the magnet 54 and the Hall effect sensor 112 with an outline of the dial assembly 35 shown in phantom. In the preferred embodiment, the magnet 54 is dimensioned to fit within a dial assembly 35 which will fit existing standard sized gauge heads. The magnet size can be varied to meet the desired dimensions. In the preferred embodiment, the magnet 54 is approximately 0.58 inches in diameter, has a thickness at the six o'clock position of about 0.19 inches, a thickness at the three and nine o'clock positions of about 0.21 inches, and a thickness adjacent to each side of the pointer 92 at approximately one o'clock and eleven o'clock of about 0.29 inches. The Hall effect sensor 112 is positioned in operative association over the top of the magnet 54 adjacent to the periphery of the magnet 54.

The magnet 54 may be made of a mixture of ferrite powder and nylon. The dial assembly 35 is preferably made from plastic or other non-magnetic materials. The gauge head 22 is preferably of non-magnetic material and the remaining elements of the gauge are made of materials not in the art.

Alternatively, the base 48 may be equipped with a channel for removeablly receiving the magnetic detector. The magnet would be made such that the passageway is open on the top surface of the magnet and the shaped face of the magnet is facing the base.

Figure 8:
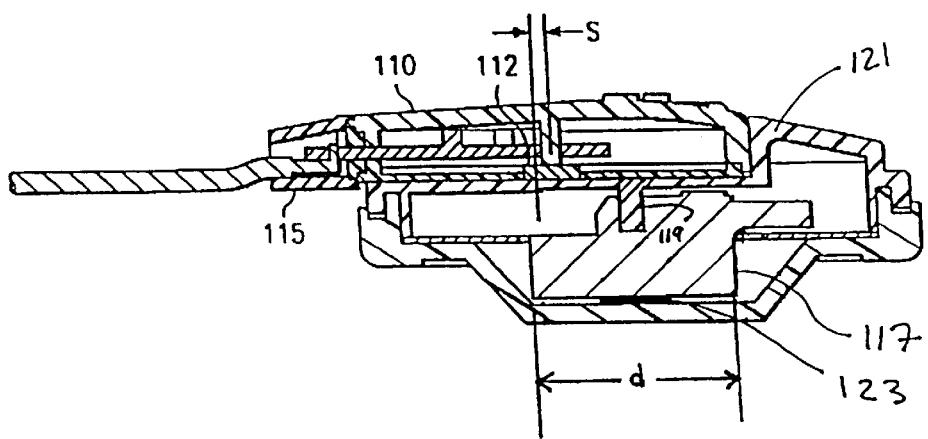
FIG. 8 is a cross sectional view of an alternative embodiment of the base, cover, and shaped magnet.

Referring to FIG. 8, a cross sectional view of an alternative embodiment is shown. In this embodiment, a pin 119, extends from the cover 121, into the top of shaped magnet 117. The shaped face of the magnet 117, is considered the top of the magnet 117. The bottom of the shaped magnet 117 rests on a stopper 123 to allow the shaped magnet 117 to rotate. Ideally, stopper 117 would be made of a material such as plastic, that would produce a minimum amount of friction between the stopper 123 and the magnet 117.

Although several embodiments of the invention have been illustrated in the accompanying drawings and described in the foregoing detailed description, it will be understood that the invention is not limited to the embodiments disclosed but is capable of numerous rearrangements, modifications and substitutions of parts and elements without departing from the spirit of the invention.

It is claimed:

1. A removable magnetic detector adapted to be used with a dial assembly equipped with a magnet, comprising:
   a housing adapted to be removably attached to a dial assembly; and
   a magnetic sensor, wherein said magnetic sensor is located in said housing.

2. A magnetic detector of claim 1 wherein said magnetic sensor is a Hall effect sensor.

3. A magnetic detector adapted to be used with a dial assembly having a generally circular shaped magnet having a variable thickness and having a magnetic axis having magnetic poles at the three o'clock and nine o'clock positions, said generally circular shaped magnet being pivotable about a pin and said magnetic axis, wherein said generally circular shaped magnet has a thickness at approximately the eleven o'clock position which decreases in a counter clockwise direction to approximately the six o'clock position and which increases in thickness from the six o'clock position to the approximately one o'clock position, comprising:
   a housing for attachment to the dial assembly; and
   a magnetic sensor mounted on said housing.

4. A magnetic detector of claim 3 wherein said magnetic sensor is a Hall effect sensor.

5. A magnetic detector of claim 4 wherein said housing and said magnetic sensor are dimensioned such that said magnetic sensor will be positioned operatively adjacent said generally circular shaped magnet when the magnetic detector is attached to said dial assembly.

6. A magnetic detector of claim 4 wherein said housing and said magnetic sensor are dimensioned such that said magnetic sensor will be positioned at a distance from the outside perimeter of said generally circular shaped magnet at a ratio of between about 1:5 and 1:8 or the radius of said generally circular shaped magnet, when the magnetic detector is attached to the dial assembly.

7. A magnetic detector of claim 3 wherein said housing and said magnetic sensor are dimensioned such that said magnetic sensor will be positioned operatively adjacent said generally circular shaped magnet when the magnetic detector is attached to the dial assembly.

8. A magnetic detector of claim 3 wherein said housing and said magnetic sensor are dimensioned such that said magnetic sensor will be positioned at a distance from the outside perimeter of said generally circular shaped magnet at a ratio of between about 1:5 and 1:8 or the radius of said generally circular shaped magnet, when the magnetic detector is attached to the dial assembly.

9. A removable magnetic detector adapted to be used with a dial assembly having a generally circular shaped magnet having a variable thickness and having a magnetic axis having magnetic poles at the three o'clock and nine o'clock positions, said generally circular shaped magnet being pivotable about a pin and said magnetic axis, wherein said generally circular shaped magnet has a thickness at approximately the eleven o'clock position which decreases in a counter clockwise direction to approximately the six o'clock position and which increases in thickness from the six o'clock position to the approximately one o'clock position, said dial assembly also having a cover which defines a channel, comprising:
   a housing defining ridges dimensioned to be receivable in said channel; and
   a magnetic sensor located in said housing;
   wherein said magnetic sensor is located in said housing such that when the housing is attached to said dial assembly said sensor is positioned operatively adjacent to said generally circular shaped magnet.

10. A removable magnetic detector of claim 9 wherein said magnetic sensor is a Hall effect sensor.

11. A removable magnetic detector of claim 10 wherein said housing and said magnetic sensor are dimensioned such that said magnetic sensor will be positioned at a distance from the outside perimeter of said generally circular shaped magnet at a ratio of between about 1:5 and 1:8 or the radius of said generally circular shaped magnet.

12. A removable magnetic detector of claim 9 wherein said housing and said magnetic sensor are dimensioned such that said magnetic sensor will be positioned at a distance from the outside perimeter of said generally circular shaped magnet at a ratio of between about 1:5 and 1:8 or the radius of said generally circular shaped magnet.

13. A removable magnetic detector adapted to be used with a dial assembly having a generally circular shaped magnet having a variable thickness and having a magnetic axis having magnetic poles at the three o'clock and nine o'clock positions, said generally circular shaped magnet being pivotable about a pin and said pivot axis, wherein said generally circular shaped magnet has a thickness at approximately the eleven o'clock position which decreases in a counter clockwise direction to approximately the six o'clock position and which increases in thickness from the six o'clock position to the approximately one o'clock position, said dial assembly also having a housing which defines a channel, comprising:

a housing defining ridges dimensioned to be receivable in said channel; and a magnetic sensor located in said housing;

wherein said magnetic sensor is located in said housing such that when the housing is attached to said dial assembly said sensor is positioned operatively adjacent to said generally circular shaped magnet.

14. A magnetic detector of claim 13 wherein said magnetic sensor is a Hall effect sensor.

15. A magnetic detector of claim 14 wherein said housing and said magnetic sensor are dimensioned such that said magnetic sensor will be positioned at a distance from the outside perimeter of said generally circular shaped magnet at a ratio of between about 1:5 and 1:8 or the radius of said generally circular shaped magnet.

16. A magnetic detector of claim 13 wherein said housing and said magnetic sensor are dimensioned such that said magnetic sensor will be positioned at a distance from the outside perimeter of said generally circular shaped magnet at a ratio of between about 1:5 and 1:8 or the radius of said generally circular shaped magnet.

* * * * *

UNITED STATES PATENT AND TRADEMARK OFFICE
CERTIFICATE OF CORRECTION

PATENT NO. : 6,679,116 B2
DATED : January 20, 2004
INVENTOR(S) : Herbert G. Ross, Jr.

It is certified that error appears in the above-identified patent and that said Letters Patent is hereby corrected as shown below:

<u>Title page,</u>
Item [62], Related U.S. Application Data, Division of application no. 09,758,857, delete "filed on Nov. 10, 2001.", and insert -- now U.S. Patent No. 6,564,632, filed on January 11, 2001. --.

Signed and Sealed this

Twenty-seventh Day of July, 2004

JON W. DUDAS
*Acting Director of the United States Patent and Trademark Office*